United States Patent [19]
Haglöf

[11] 3,987,946
[45] Oct. 26, 1976

[54] WARDROBES

[76] Inventor: Börje Haglöf, Skulptorvagen 26, S-121 43 Johanneshov, Sweden

[22] Filed: July 12, 1974

[21] Appl. No.: 487,894

[30] Foreign Application Priority Data
July 16, 1973 Sweden............................. 7309929

[52] U.S. Cl.................. 224/42.46 A; 224/42.42 A; 224/42.46 B
[51] Int. Cl.²......................................... B60R 9/00
[58] Field of Search ............. 224/42.46 B, 42.46 R, 224/42.42 A, 42.42 R, 42.45 B, 42.45 R, 29 D, 29 R; 150/1, 14; 190/61

[56] References Cited
UNITED STATES PATENTS

| | | | |
|---|---|---|---|
| 1,008,315 | 11/1911 | Dunham......................... | 150/14 UX |
| 2,196,341 | 4/1940 | Rush ........................... | 224/29 D UX |
| 2,584,646 | 2/1952 | Wagstaff...................... | 224/42.42 R |
| 3,465,930 | 9/1969 | La Croix...................... | 224/42.42 R |

FOREIGN PATENTS OR APPLICATIONS

| | | |
|---|---|---|
| 1,012,812 | 7/1952 | France |
| 1,146,391 | 11/1957 | France |

*Primary Examiner*—Robert J. Spar
*Assistant Examiner*—Jerold M. Forsberg
*Attorney, Agent, or Firm*—Oldham & Oldham Co.

[57] ABSTRACT

A wardrobe comprising a rigid generally flat frame structure arranged to support a casing in the form of a flat bag and provided with suspension band means, wherewith the frame and casing can be suspended from the rear side of the back support of a vehicle front seat in a manner such that said frame can be held pressed thereagainst, the casing having an opening provided with a zip-fastener.

1 Claim, 4 Drawing Figures

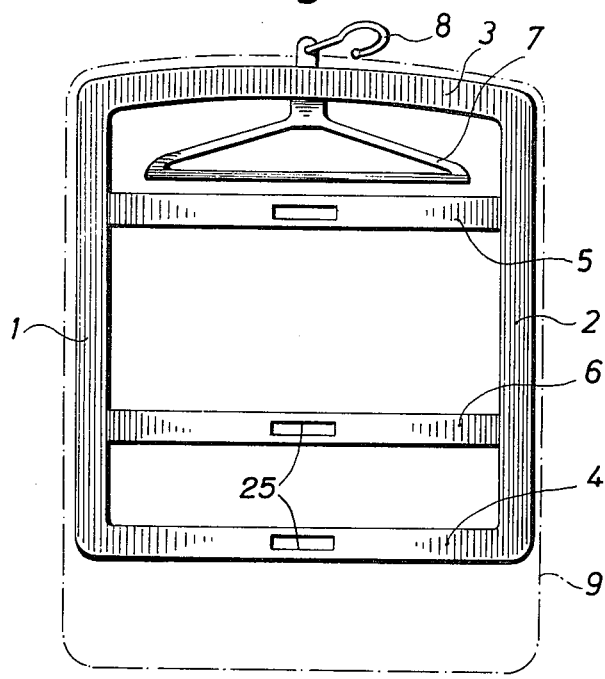
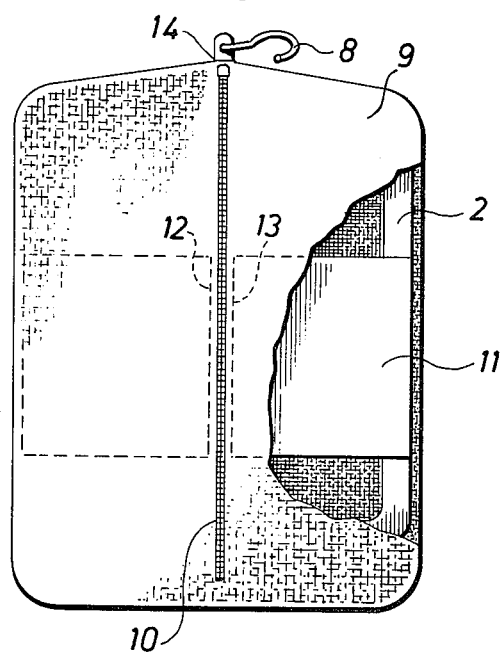

WARDROBES

The present invention relates to a wardrobe, and more particularly to a wardrobe for hanging clothes in a vehicle compartment.

An object of the invention is to provide a wardrobe which can be placed in a compartment of a vehicle so that said wardrobe does not block the vision of the driver or constitute an obstacle to passengers driven therein. In accordance with the invention, the wardrobe is constructed so that it can be hung on the rear side of the back support of the vehicle front seats and held tightly against said back support.

To this end the wardrobe according to the invention comprises mainly a substantially flat frame structure enclosed in a casing in the form of a flat bag and provided with strap-like suspension means, whereby the frame structure with the casing can be attached to the back support of a vehicle seat in a manner such that one side of said frame structure can be held firmly pressed against the rear side of said back support.

Figure 1:
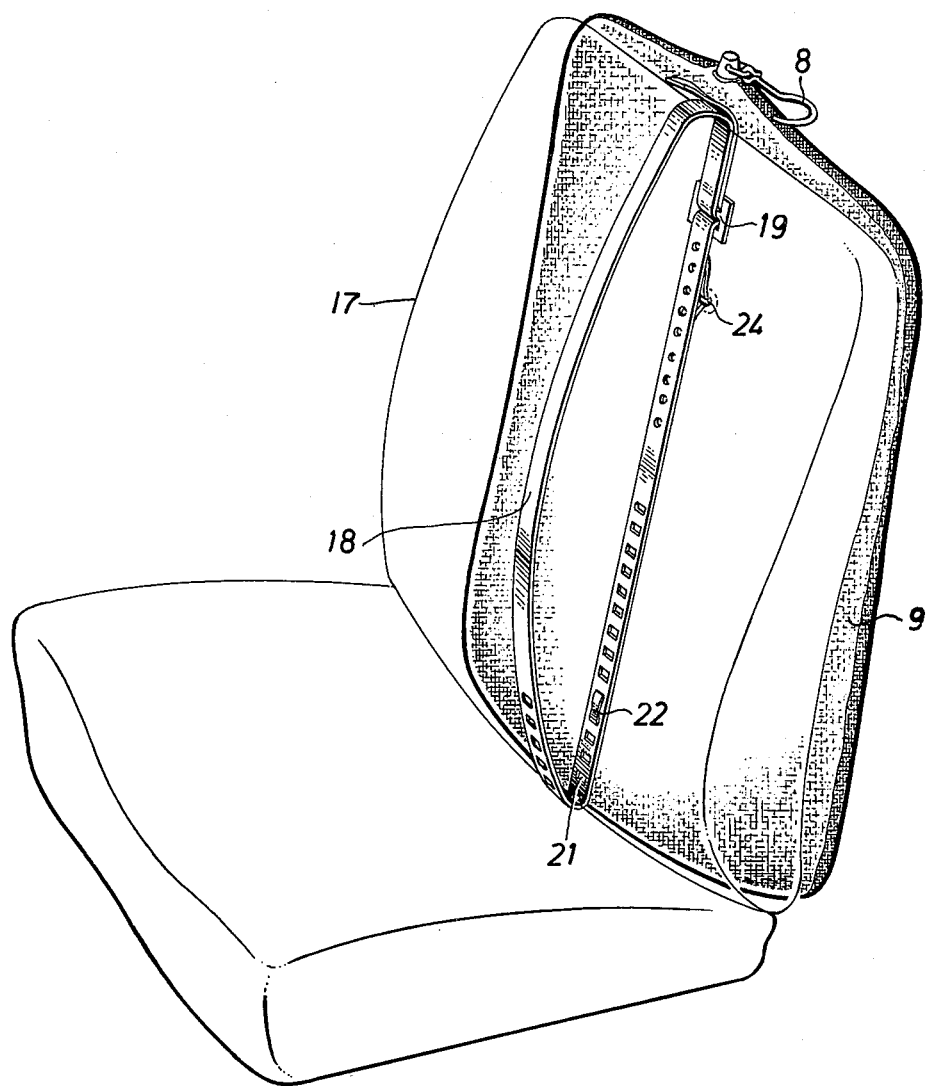
Figure 2:
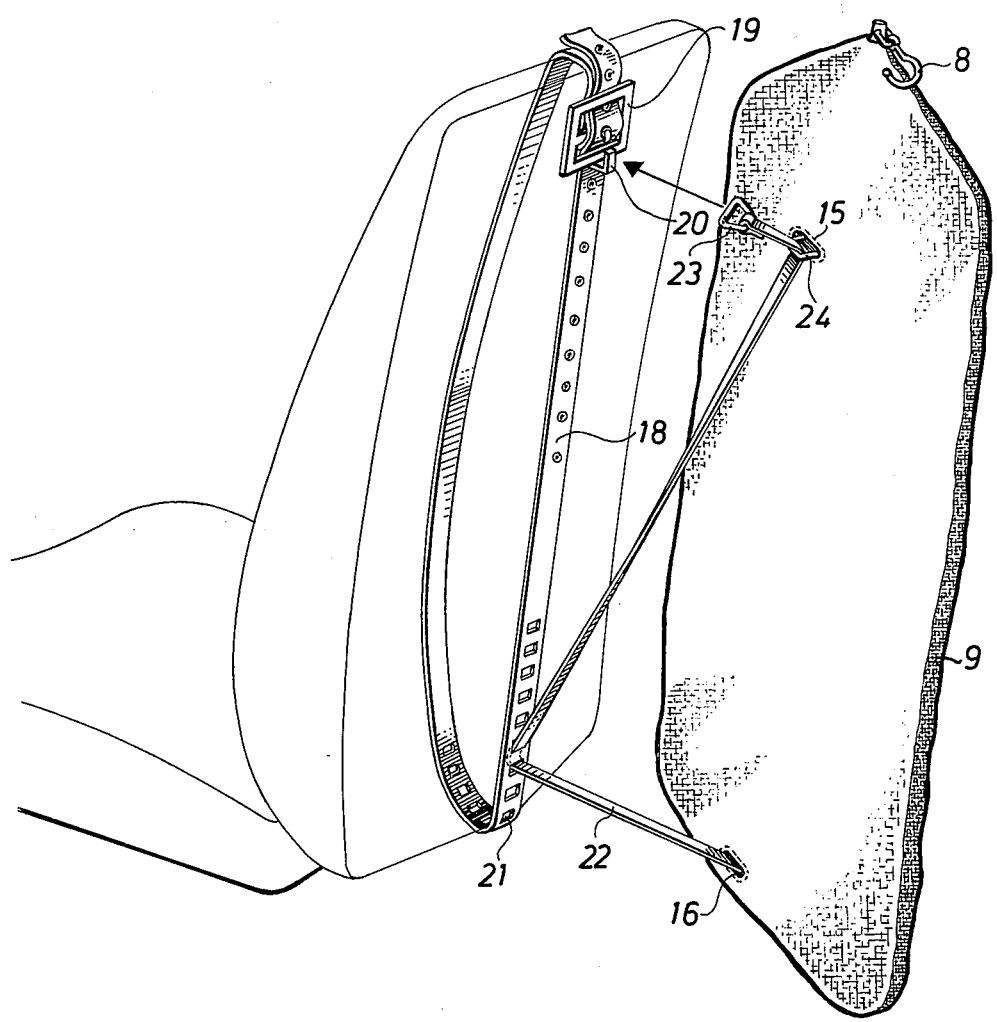

So that the invention will be more readily understood and further features thereof made apparent, a wardrobe constructed in accordance with the invention will now be described with reference to the accompanying drawings, in which FIG. 1 shows in perspective a wardrobe according to the invention attached to the back support of a vehicle seat, FIG. 2 shows in perspective and in more detail the manner in which the wardrobe is suspended, FIG. 3 is a plan view of the frame structure, and FIG. 4 is a partially cut away, plan view of the wardrobe seen towards the rear side thereof.

The wardrobe of the illustrated embodiment comprises a rigid frame structure, one embodiment of which is shown in FIG. 3. The frame structure comprising a generally rectangular frame of wood, metal or plastics material and has two vertical side members 1, 2, an upper horizontally extending, slightly upwardly curved transverse member 3, a lower, horizontally extending transverse member 4 and two intermediate horizontally extending transverse member 5, 6. A coat hanger 7 is mounted between the uppermost transverse member 3 and the upper one of the intermediate transverse members 5, 6, said coat hanger suitably being pivotable so that it may be rotated in relation to the frame, thereby to facilitate the hanging of clothes thereon and the removal of clothes therefrom.

The external dimensions of the frame 1 should generally coincide with the dimensions of a back support of the front seat of a conventional automobile.

The embodiment shown in FIG. 3 is given by way of example only, and many other embodiments of the frame are conceivable.

As shown in the drawings, the frame, when seen in its position of use, may be provided at the top thereof with a hook 8, by means of which the wardrobe can be hung in, for example, a hotel closet, when not used in the automobile.

Placed on the outside of the frame is a casing 9, which may be made of fabric or a plastics material or some other appropriate flexible material, and has the form of a flat bag which conforms to the shape of the frame, although said bag may suitably extend slightly below the frame as shown in FIGS. 3 and 4. The bag may have a length such that a conventional jacket may be accomodated therein. On the side of the bag which is intended to face away from the back support of the vehicle seat there is provided a central, longitudinally extending opening having closure means 10 which enable the bag to be opened and closed, said means being in the form of a zip fastener, chain fastener or some other appropriate fastening device. Extending horizontally around the inside of the bag is one or more tensioning strips 11, said strips being sewn at their vertically extending end edges to the bag, adjacent the central opening to form seams 12, 13. The length of the tensioning strip is slightly smaller than the peripheral dimension of the bag between the seams 12, 13, whereby upon closing the closure means 10 the tensioning strip will be tightened around the vertical transverse members 2, 3 of the frame. This serves to compress the clothes present in the wardrobe, thereby to reduce the thickness thereof so that it occupies less space. The tensioning strip may optionally be replaced with a number of narrow strips which extend parallel to one another.

The bag 9 may be securely connected to the frame at a number of positions thereon and has at the top thereof a hole 14 for the hook 8 and is also provided with holes 15, 16 on the rear side of the bag (FIG. 2) on a level with the transverse members 5 and 4 of the frame.

With the illustrated embodiment, two suspension bands are used for hanging the wardrobe on the back support 17 (FIGS. 1 and 2) of the front seat of a vehicle. One band, 18, is passed around the back support vertically and is firmly tightened there around with a conventional buckle 19 which, in the illustrated case, is provided with a hook 20 on the side thereof located at the bottom of the buckle when the band is in its operative position. The band 18 is provided along the portion thereof located in the vicinity of the lower end of the back support with a number of holes 21.

One end of the other band, 22, is passed through the hole 16 and is attached in a suitable manner (not shown) to the lowermost transverse member 4 of the frame or to the intermediate member 6. The other end of the band 22, said end being free, is provided with a loop 23 which fits the hook 20 on the buckle. The free end of the belt 22 is passed through a conforming hole 21 in the band 18 and back through another of these holes, as is best seen from FIG. 2, and is then passed through a stirrup 24 attached to the cross-member 5, whereupon the loop 23 is attached to the hook 20. By suitably adjusting the length of the band 22 and by selecting a suitable hole 21, the wardrobe can be made to lie compactly against the rear side of the back support, as shown in FIG. 1, in which position it presents no obstacle to possible passengers in the rear-seat of the vehicle.

The aforedescribed arrangement with two bands affords the advantage whereby, if desired, the wardrobe can be removed from the vehicle simply be releasing the band 22 from the band 18, the latter band being allowed to remain on said back support. A simpler attachment arrangement using only one band, corresponding to band 18 can be used, however, said band being attached to the frame, e.g. by drawing said band through the openings 25 (FIG. 3) in the cross members 4, 5, 6, and tightening the band around the back support by means of a buckle. The frame may also be provided with several loops which can be attached to hooks mounted on a tensioning band, similar to band 18, extending around the back support. Further, a horizontal band may optionally be attached to the lower portion of the frame and tightened around the lower part of the back support.

I claim:

1. A wardrobe for containing clothes in a motor vehicle comprising a rigid generally flat frame structure provided with means for suspending clothes thereon, a casing shaped as a flat bag enclosing and carried by said frame structure, a first strap being adapted to be tensioned vertically around the back support of the front seat of the vehicle, a second strap connected to said strap and to said frame structure at two vertically aligned points the back support of the front seat of the vehicle to retain the frame structure with the casing at the rear side of said back support with one side of the bag in continual close engagement therewith, the opposite side of the casing having a closable opening for access to its interior and having a band attached at its ends to the inside of the casing adjacent both sides of the opening, the band extending around the frame and having a length somewhat less than the corresponding circumferential dimension of the bag between the attachment points of the band whereby when the opening is closed, the tension band is tightened around the frame and the contents of the wardrobe.

* * * * *